(12) United States Patent
Koch et al.

(10) Patent No.: US 11,486,988 B2
(45) Date of Patent: Nov. 1, 2022

(54) METHOD FOR CALIBRATING THE ALIGNMENT OF A MOVING OBJECT SENSOR

(71) Applicant: Volkswagen Aktiengesellschaft, Wolfsburg (DE)

(72) Inventors: Niklas Koch, Wolfsburg (DE); Christian Merfels, Braunschweig (DE); Ugur Kekec, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 422 days.

(21) Appl. No.: 16/728,308

(22) Filed: Dec. 27, 2019

(65) Prior Publication Data

US 2020/0209369 A1 Jul. 2, 2020

(30) Foreign Application Priority Data

Dec. 28, 2018 (DE) ...................... 10 2018 133 693.4

(51) Int. Cl.
*G01S 7/497* (2006.01)
*G01S 7/40* (2006.01)
(Continued)

(52) U.S. Cl.
CPC .............. *G01S 7/4972* (2013.01); *G01S 7/40* (2013.01); *G01S 7/52004* (2013.01); *B60W 50/00* (2013.01); *B60W 2050/0083* (2013.01)

(58) Field of Classification Search
CPC ...... G01S 7/4972; G01S 7/40; G01S 7/52004; G01S 17/931; B60W 50/00; B60W 2050/0083; G01D 18/00
See application file for complete search history.

(56) References Cited

U.S. PATENT DOCUMENTS 6,535,114 B1 3/2003 Suzuki et al. ................ 340/435
9,348,017 B2 5/2016 Steinlechner
(Continued)

FOREIGN PATENT DOCUMENTS

CN 107192409 A 9/2017 ............. G01D 18/00
DE 10122664 A1 11/2002 ............. G01S 7/497
(Continued)

OTHER PUBLICATIONS

German Office Action, Application No. 102018133693.4, 5 pages, dated Aug. 28, 2019.
(Continued)

*Primary Examiner* — Marthe Y Marc-Coleman
(74) *Attorney, Agent, or Firm* — Slayden Grubert Beard PLLC

(57) ABSTRACT

This disclosure relates, e.g., to a method for calibrating the alignment of a moving object sensor that comprises the steps: Detection of the movement of the object sensor, multiple detection of at least one static object by the moving object sensor at different positions of the object sensor, calculation of the relative positions of the static object with respect to the corresponding positions of the object sensor, calculation of anticipated positions of the static object from the relative positions while assuming an alignment error of the object sensor, calculation of an error parameter from the anticipated positions, and minimization of the error parameter by adapting the alignment error of the object sensor.

20 Claims, 1 Drawing Sheet

(51) Int. Cl.
  *G01S 7/52*   (2006.01)
  *B60W 50/00*  (2006.01)

(56) References Cited

U.S. PATENT DOCUMENTS

| | | | |
|---|---|---|---|
| 9,726,754 B2 | 8/2017 | Massanell et al. | |
| 9,776,629 B2 | 10/2017 | Heinrichs-Bartscher | |
| 10,088,553 B2 | 10/2018 | Zeng et al. | |
| 2010/0165102 A1 | 7/2010 | Klebanov et al. | 348/135 |
| 2013/0218398 A1 | 8/2013 | Gandhi et al. | 701/31.1 |
| 2015/0224986 A1 | 8/2015 | Heinrichs-Bartscher | 701/70 |
| 2015/0276923 A1 | 10/2015 | Song et al. | 702/97 |
| 2016/0267657 A1 | 9/2016 | Gupta et al. | 348/148 |
| 2017/0236419 A1* | 8/2017 | Grewe | G08G 1/164 340/870.07 |

FOREIGN PATENT DOCUMENTS

| | | | | |
|---|---|---|---|---|
| DE | 102009046124 A1 | | 5/2011 | B60R 1/00 |
| DE | 102012018012 A1 | | 5/2014 | B60W 50/04 |
| DE | 102013209494 A1 | | 11/2014 | G01S 7/40 |
| JP | 2006162353 A | | 6/2006 | B60R 1/00 |
| JP | 2008222345 A | | 9/2008 | B65H 3/46 |
| JP | 2008224352 A | | 9/2008 | G01P 13/04 |
| JP | 2017133861 A | * | 8/2017 | |
| KR | 2013000202 A | | 1/2013 | G01S 13/06 |
| WO | 00/75687 A1 | | 12/2000 | G01S 13/93 |
| WO | 2014/003615 A1 | | 1/2014 | G01S 13/93 |
| WO | 2015/151681 A1 | | 10/2015 | G01C 3/06 |
| WO | 2016/198563 A1 | | 12/2016 | G01S 13/93 |
| WO | 2017/133661 A1 | | 8/2017 | H01N 19/51 |

OTHER PUBLICATIONS

Paffenholz, Jens-André, "Direct Geo-Referencing of 3D Point Clouds with 3D Positioning Sensors," Dissertation, Department of Civil Engineering, The University of Hannover, ISBN-978-3-7696-5101-0, 132 pages, 2012.

* cited by examiner

METHOD FOR CALIBRATING THE ALIGNMENT OF A MOVING OBJECT SENSOR

CROSS-REFERENCE TO RELATED APPLICATIONS

This application claims priority to German Patent Application No. DE 10 2018 133 693.4, filed on Dec. 28, 2018 with the German Patent and Trademark Office. The contents of the aforesaid Patent Application are incorporated herein for all purposes.

TECHNICAL FIELD

The present invention relates to a method for calibrating the alignment of a moving object sensor, in particular an object sensor that moves in a vehicle, such as an object sensor installed in the vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In modern motor vehicles, in particular in motor vehicles that drive semi-autonomously or autonomously, a wide range of sensors are installed that serve to self-position the vehicle with respect to the vehicle's surroundings. To accomplish this, distinctive static structures and patterns, so-called positioning features, are recorded in the surroundings of the vehicle by means of a special sensor system and are used to position the vehicle with respect to these positioning features. Typical sensors are cameras, and radar, ultrasonic or laser scanner apparatuses. While driving, structures of interest can be detected by processing the sensor data recorded by the sensor system and assigned to corresponding entries in a map in order to calculate the vehicle position and the alignment of the vehicle. The quality of such positioning that occurs automatically while driving significantly depends on the precision with which positioning features were recorded and the importance of their assignment to, for example, previously known map objects. The precision of measurement is in turn dependent on the sensor system used in each case and the calibration.

Calibrating the sensor system is complex, requires time, and ideally should be repeated regularly including during a trip since the parameters that result from the calibration process always refer exclusively to one snapshot of the sensor properties that for example can change over time under mechanical and thermal influences.

In the calibration process, extrinsic and intrinsic sensor parameters are determined. Whereas the intrinsic parameters describe special properties and deviations of the sensor measuring procedure for each sensor, basically the specific installation position and alignment of the sensor in the vehicle, such as the alignment of the sensor relative to the vehicle's longitudinal axis, are established by the extrinsic parameters. Specifically with regard to the sensor alignment, even the smallest changes in the alignment can have a major influence on measurements in the long-distance range which significantly impairs positioning.

One aspect in this case is the lateral deviation of the actual position of the sensor relative to the vehicle axis. Normally, the lateral position of the vehicle sensor can be determined with great precision during installation so that, depending on the dimensions of the respective vehicle model, a lateral deviation of the sensor position relative to a vehicle longitudinal axis, or respectively the driving lane used by the vehicle, can reliably be determined. Any errors in measuring the installation position or errors occurring subsequently with respect to the lateral deviation while using the sensor in the vehicle are transferred one-to-one to the position error of a detected object in the vehicle's surroundings. The errors in positioning that result from lateral deviations are therefore negligibly small as a rule.

A significantly greater problem is the orientation of the sensor in space since the angle errors have a varying effect on positioning depending on the distance between the sensor and the detected object. With an azimuth angle error of for example 1°, the lateral error for a measuring point 60 meters distant is already about 1 meter. The error becomes greater the more distant the sensor is from the object. Deviations in the sensor orientation in space also frequently occur during continuous operation, even when the greatest possible care is taken while installing the sensor.

Methods are known in the prior art, for example in the field of robotics, for calibrating sensors, for example relative to their alignment. The solutions which are at least described in the prior art work fully automatically. Frequently, a subsequent validation of the identified calibration parameters is also required. Calibration processes are frequently very time-consuming as well and require specially trained personnel since in particular the validation of a calibration method can generally only be performed using special technical tools.

In US patent application US2010/0165102 A1, a method is for example described for determining the tilt angle of a vehicle camera by means of image processing, wherein a stationary object is detected in several images from the moving camera installed in a vehicle, and a camera deviation is inferred from a change in the position of the stationary object in the individual images. In this case it is assumed that the vehicle is moving on a private line. Furthermore, a steering angle of the vehicle is detected in order to exclude an influence of the alignment of the vehicle axis on the measurement.

In US2016/02267657 A1, a method is described for dynamically calibrating a vehicle camera in which a camera installed in the vehicle moves along a straight line, and the object trajectories are determined from a plurality of objects detected in the images from which a vanishing point of the object trajectories is determined. A potential camera misalignment can then be ascertained from the change in position of the vanishing point.

A camera-based method is also described in JP 2008 222 345 A in which vehicle movement is deduced from the change in positions over time from several static objects detected by the camera.

In US 2013/0218398 A1, a method is described for determining the misalignment of an object sensor in which one or more objects is detected during a straight-line vehicle movement, and the progression over time of the angle at which the objects are detected while the vehicle is moving is compared with an angle anticipated from the vehicle movement. A potential misalignment of the sensor is then deduced from a deviation between the measured and anticipated value.

A similar method is described in US 2015/0276923 A1 in which a stationary object is detected at at least two different times, and a misalignment of the sensor is deduced from deviations between the coverage angles anticipated from vehicle movements and the detected coverage angles.

Finally, a method is known from WO2016/198563 A1 in which a misalignment of a radar sensor is determined in which at least one stationary object is detected several times during a vehicle movement, the detected positions are converted into a global coordinate system with the inclusion of correction factors, and the error is minimized by using the correction factors.

SUMMARY

An object thus exists to make the aforesaid methods more robust so that regular calibration of object sensors is enabled with minimal computing effort while operating a vehicle.

This object is solved by the method according to the independent claim(s). Various embodiments of the invention are the discussed in the dependent claims and the following description.

In one exemplary aspect, a method for calibrating the alignment of a moving object sensor is provided. The method comprises the steps:

detecting the movement of the object sensor;

repeated detection of at least one static object by the moving object sensor in different positions of the object sensor;

calculating the relative positions of the static object with reference to the corresponding positions of the object sensor;

calculating anticipated positions of the static object from the relative positions assuming an alignment error of the object sensor;

calculating an error parameter from the expected positions; and minimizing the error parameter by adapting the alignment error of the object sensor.

The details of one or more embodiments are set forth in the accompanying drawings and the description below. Other features will be apparent from the description, drawings, and from the claims.

BRIEF DESCRIPTION OF THE DRAWINGS

Figure 1:
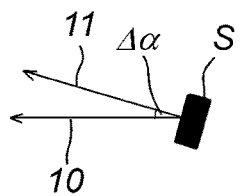
Figure 2:
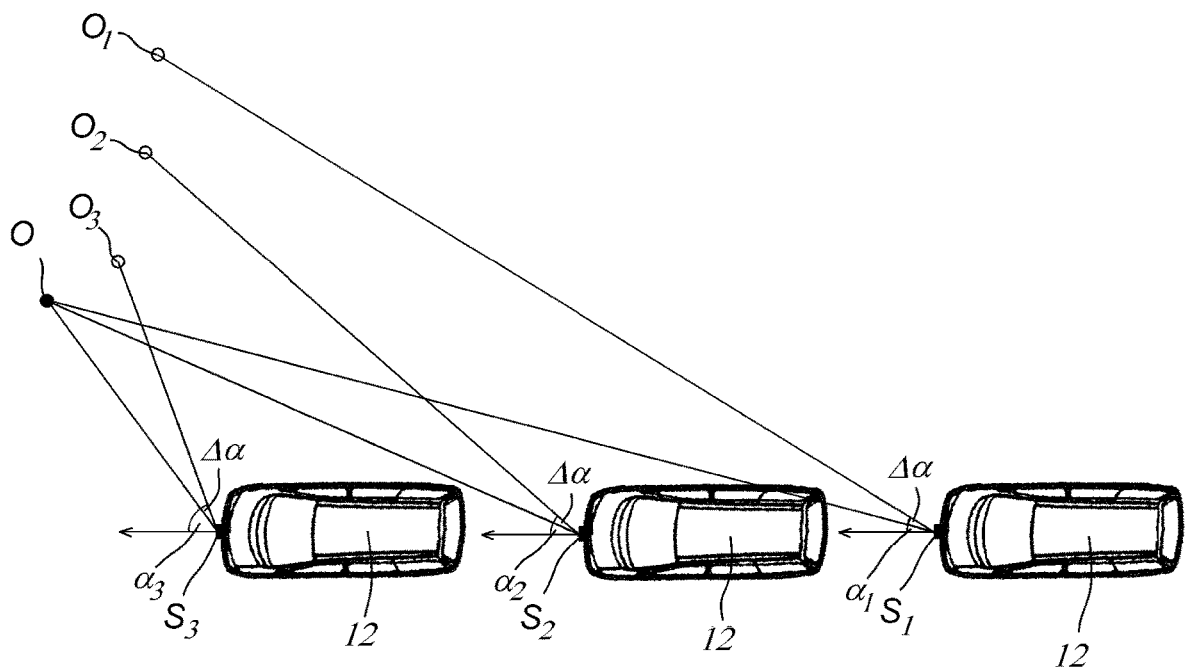
Figure 3:
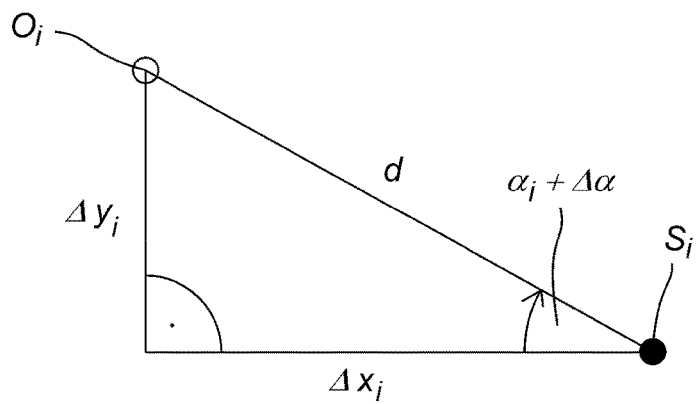

IN THE FIGS.:

FIG. 1 shows a schematic representation of a sensor misalignment;

FIG. 2 shows the detection of an object by means of an object sensor mounted on a moving vehicle;

FIG. 3 shows the geometric situation of the relative position of an object to the sensor with an assumed sensor misalignment.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method for calibrating the alignment of a moving object sensor that comprises the steps of: Detecting of the movement of the object sensor, multiple detecting of at least one static object by the moving object sensor at different positions of the object sensor, calculating of the relative position of the static object with respect to the corresponding positions of the object sensor, calculating of anticipated positions of the static object from the relative positions while assuming an alignment error of the object sensor, calculating of an error parameter from the anticipated positions, and minimizing of the error parameter by adapting the alignment error of the object sensor.

The present aspect accordingly proposes to provide a sensor calibration using an alignment error of the object sensor. The associated reduction of the data detection, or respectively data processing, required for sensor calibration to a few features which can be detected robustly increases both, the robustness of ascertaining a potential alignment error, as well as the calculation speed during operation.

The method according to the present aspect is based on the consideration that, in an error-free detection of a static object, the calculated relative position of the static object with respect to the corresponding position of the object sensor only depends on the movement of the object sensor. When taking into account the movement of the object sensor, the position of the static object should therefore not change. While taking into account an alignment error of the object sensor, the detected relative static object positions with respect to the corresponding object sensor positions deviate from the anticipated static object positions, however. It is therefore proposed in some embodiments to calculate the anticipated positions while assuming an alignment error of the object sensor. If the assumed alignment error corresponds to the actual alignment error of the object sensor, the anticipated positions of the static object should not change when taking into account the movement of the object sensor. When the assumed alignment error does not correspond to the actual alignment error, deviations between the individual anticipated positions are established. An error parameter for the anticipated position can be ascertained from these deviations. The assumed alignment error is then adapted so that the error parameter is minimized. The alignment error at which the error parameter is minimal then corresponds to the actual alignment error of the object sensor.

The method in some embodiments may be realized by detecting a wide range of different static objects. For example, flat objects may be detected, wherein for example it can be checked how effectively the surfaces to be detected at different times can be brought into congruence with each other while taking into account an alignment error. Individual features that are processed further in the method may, e.g., be extracted from flat objects, for example also by means of suitable image processing such as edge detection.

To reduce the accumulating data, it is proposed that the object sensor detects the at least one static object in a plane. In some embodiments, the method therefore is conducted two-dimensionally. Even if the data provided by the object sensor are three-dimensional data, a two-dimensional plane can always be extracted from the three-dimensional data set for further processing in some embodiments.

In some embodiments, robust data for sensor calibration result when in a two-dimensional capacity the at least one static object is an elongated object that then appears substantially punctiform in the detection plane. Even when the data has interference, punctiform data can also be detected very reliably from the static objects used for sensor calibration and can be effectively tracked when the vehicle is moving. Suitable elongated rod-shaped objects that are frequently located in a vehicle's surroundings are for example traffic signs, stoplights, streetlights, guideposts, etc. In three-dimensional detection, lane markers, surfaces such as building façades, fences, guide rails and the like can be used for data evaluation.

In some embodiments, the alignment error of the object sensor comprises an azimuth angle error. In sensor calibration, the azimuth angle error generally represents the error with the greatest effect on the positioning of static objects since the azimuth angle error has an increasingly greater effect in particular as the distance of the object from the sensor increases. In some embodiments that work in a two-dimensional plane, it can be taken into account that alignment errors in the other solid angle directions can also contribute to a lesser extent to the detected azimuth angle error. If the evaluation is reduced to only the azimuth angle error, the error correction in fact refers to a "pseudo-azimuth angle" since it is assumed that the entire error is based on the azimuth angle. Depending on the extent of the influence of the other angle errors on the azimuth angle, the pseudo-azimuth angle determined by the method according to the present embodiments cannot always be used as the correction angle for correcting/further processing other sensor data since the detected pseudo-azimuth angle would then not correspond to the actual azimuth angle error. In these cases, the method in some embodiments can at least serve as an indication of an alignment error of the object sensor and be used to generate a corresponding warning message.

In some embodiments, the error parameter is iteratively minimized by changing the azimuth angle error. In this case, for example a greatest possible error is assumed for the azimuth error. The position of the static object is ascertained taking into account the greatest possible error. By skillfully varying the azimuth angle error, recalculating the object positions and determining the error parameter, the actual azimuth angle error may be ascertained by means of a suitable stop criterion. The stop criterion may for example entail that the error parameter will no longer significantly change given increasingly smaller changes in the azimuth angle error.

In some embodiments, the error parameter can be minimized by an optimization method. For example, an optimization problem may be formulated to minimize the error parameter with respect to the azimuth angle error. Suitable optimization methods are for example curve fitting methods for example based on Gauß-Markov models which are known per se.

A wide range of values can be used as a suitable error parameter that is to be minimized. For punctiform static objects, the averages of the anticipated positions of the static object may be used as the error parameter, for example.

A suitable error parameter may for example also be derived from the Helmert point error. The Helmert point error of an object results in two dimensions from the root of the sum of the squared standard deviations of the X-coordinate of the object and the squared standard deviation of the Y-coordinate of the object. These can be expressed by the following the equation:

$$S_{P_i}^H = \sqrt{S_{x_i}^2 + S_{y_i}^2}$$

where:
$S_{P_i}^H$=is the Helmert point error of the i-th object,
$S_{x_i}^2$=is the standard deviation of the X-coordinate of the i-th object, and
$S_{y_i}^2$=is the standard deviation of the Y-coordinate of the i-th object.

In some embodiments, more than one static object is detected. In these cases, the sum of the Helmert point error $S_{sum}^H$ may be used as the error parameter for punctiform static objects in two dimensions and minimized by suitably varying the azimuth angle error:

$$s_{sum}^H = \sum_{i=1}^{n} (s_{P_i}^H)$$

The Helmert point error is also suitable as a measure of the compactness or quality of the assignment of the detections to the repeatedly detected objects. If several objects are detected several times in sequential measurements, these repeatedly detected objects can be assigned to each other with the assistance of a tracking method. This assignment can frequently occur through sensor processing.

If several static objects are detected and in some embodiments, the movement of the object sensor itself can already be calculated from the tracking of the static objects when processing sensor data, given the prerequisite that the relative positions of the static objects remain unchanged.

In some embodiments, the vehicle position and the driving direction at the time of each detection are detected separately, for example using suitable additional sensors on the object sensor or on the vehicle in which the object sensor is installed, such as speed sensors, direction sensors that for example can be detected by steering angle sensors, and the like.

Frequently, satellite-supported navigation sensors may also be available in some embodiments, with which the absolute positions of the object sensor can be detected in each detection. To increase the precision of sensor movement detection, absolute positioning methods such as satellite navigation methods can be combined with relative movement information.

Independent of whether absolute positions of the object sensor are used, or relative positions of the object sensor at the individual points in time of each detection, the relative or absolute positions of the static object may be calculated by polar appending from the positions of the object sensor in some embodiments. The embodiments are beneficial because the direction error is directly included in the ascertained position of the static object with polar appending.

If the azimuth angle error has been ascertained and in some embodiments, an error-corrected actual position of the static object may also be calculated from the position of the static object measured in this manner. These embodiments are therefore also suitable for ascertaining error-corrected absolute positions of static objects when the absolute position of the object sensor is known, which for example can be used for cartography tasks.

Conversely and in some embodiments, the error-corrected absolute position of the static object may also be compared with an absolute position of the static object that is for example known from map data to thereby ascertain the absolute position of the object sensor even without tools such as for example satellite-supported navigation.

A wide variety of sensors may be used as the object sensors, e.g., sensors that enable a measurement of angle and distance such as for example radar sensors, ultrasonic sensors, laser sensors (laser scanners) or image sensors.

In some embodiments, the object sensor is mounted on a vehicle such as a motor vehicle, or is installed therein. The vehicle may for example be an autonomously driving or partially autonomously driving vehicle.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows an object sensor S that can detect objects in the surroundings of the sensor. To calculate the detected sensor data, it is assumed that the sensor is aligned along arrow 10 in the direction of movement of the sensor. The actual sensor orientation however deviates laterally from the assumed sensor alignment 10 and is shown by the arrow 11. The angle $\Delta\alpha$ between the assumed sensor alignment 10 and the actual sensor alignment 11 accordingly represents the azimuth angle error. The object data are detected in the plane of the drawing in the depicted example. The azimuth angle error $\Delta\alpha$ is therefore an error in the lateral alignment of the sensor S.

FIG. 2 shows a schematic representation of the detection of an object O by a moving vehicle 12 on which the sensor S is installed. In the first measurement, the sensor is in position $S_1$. The object O appears at an azimuth angle $\alpha_1$. Due to the sensor error $\Delta\alpha$, the object actually appears at the angle $\alpha_1 + \Delta\alpha$ at position $O_1$, however.

At a second point in time, the vehicle 12 has moved to the middle position shown in FIG. 2. The static object O is still located at the same location, but appears at a greater angle $\alpha_2$ from sensor position $S_2$. Due to the azimuth angle error $\Delta\alpha$, the object seemingly appears to be at location $O_2$ at an azimuth angle $\alpha_2 + \Delta\alpha$, however.

In the third measurement, the vehicle 12 has moved further to the left, and the sensor is situated at location $S_3$. The actual object position O appears here at an even greater angle $\alpha_3$. The apparent position $O_3$ in the third measurement appears at an angle $\alpha_3 + \Delta\alpha$.

FIG. 3 shows how the apparent object position $O_i$ results from polar appending from the sensor position $S_i$. When the distance d is known between the sensor $S_i$ and object O that can be ascertained for example by run-time measurements of ultrasound or radar impulses, or by stereoscopic image evaluation, the distance between the sensor and the apparent object position in Cartesian coordinates results as $$\Delta x_i = d^* \sin(\alpha_i + \Delta\alpha),$$

$$\Delta y_i = d^* \cos(\alpha_i + \Delta\alpha).$$

If the sensor position $S_i$ corresponding to the vehicle movement is taken into account, the position of the object O results from polar appending to the position of the sensor S:

$$x_O = x_S + d^* \sin(\alpha + \Delta\alpha),$$

$$y_O = y_S + d^* \cos(\alpha + \Delta\alpha).$$

The object position of a static object should not change while the sensor is moving if the object position O is ascertained from the ascertained object positions $O_i$ while taking into account the actual azimuth angle error $\Delta\alpha$. If the assumed azimuth angle error $\Delta\alpha$ does not correspond to the actual azimuth angle error, the calculated actual object positions O will have more or less large deviations from the actual object position O, i.e., the object positions derived from the values $O_I$ will differ. The actual azimuth angle error $\Delta\alpha$ can then be ascertained through suitable minimization/optimization methods from an error parameter ascertained therefrom such as for example the sum of the Helmert point error for several detected objects O.

Accordingly by skillfully varying the angle $\Delta\alpha$, recalculating the object positions and determining the sum of the Helmert point error, a pseudo-azimuth angle can be determined with the assistance of a suitable stop criterion. The stop criterion can for example entail that the sum of the Helmert point error will no longer significantly change given increasingly smaller changes of $\Delta\alpha$. For example by assuming a greatest possible azimuth angle error of 2°, the sum of the Helmert point error can be calculated for the values $\Delta\alpha=2°$, $\Delta\alpha=0°$ and $\Delta\alpha=-2°$. In the next iteration step, the sum of the Helmert point error is calculated for the values $\Delta\alpha=1°$ and $\Delta\alpha=-1°$. If the sum of the Helmert point error for $\Delta\alpha=1°$ is smaller, then the calculation is continued in the next iteration step with $\Delta\alpha=0.5°$ and $\Delta\alpha=1.5°$. This is continued until the sum of the Helmert point error does not change significantly and accordingly approaches the correct pseudo-azimuth angle.

Alternatively, an optimization problem can be formulated so that $\Delta\alpha$ is optimized/searched so that $S_{sum}^H$ is minimal. Curve fit calculation methods are suitable for this (such as Gauss-Markov models).

It is also possible for the portion of the error that is actually caused by the other angles to be a different size at different locations in the sensor coordinate system. This means that theoretically, a pseudo-azimuth angle could be determined for different areas in the sensor coordinate system, for example, in the form of a matrix of any size that would remain more precise and stable.

A benefit of the method is that it can be used without great effort while driving. It is moreover a fast method that requires few resources. This is not the case with many known methods. The calculated positions of the objects using the "pseudo-azimuth angle" can be used for mapping as well as for positioning with the assistance of a map. In its simplest embodiment, the method does not offer absolute calibration, but it may however be used for example to at least give a warning that the used calibration is inappropriate. This could cause downstream applications that need precise sensor data to transition to a restricted or nonfunctional mode.

LIST OF REFERENCE NUMERALS

10 Arrow, direction of movement of the sensor, assumed sensor orientation
11 Arrow, actual sensor orientation
12 Vehicle
S Sensor
$S_i$ Different sensor positions (i=1, 2, 3)
O Object
$O_i$ Different apparent object positions
$\Delta\alpha$ Azimuth angle error
$\alpha_i$ Azimuth angle at different sensor positions (i=1, 2, 3)

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for calibrating the alignment of a moving object sensor that comprises:
    detecting the movement of the object sensor;
    repeated detection of at least one static object by the moving object sensor in different positions of the object sensor;
    calculating the relative positions of the static object with reference to the corresponding positions of the object sensor;
    calculating anticipated positions of the static object from the relative positions using an assumed alignment error of the object sensor;
    calculating an error parameter from the anticipated positions;
    minimizing the error parameter by adapting the alignment error of the object sensor; and
    determining an actual alignment error of the object sensor from the adapted alignment error at which the error parameter is substantially minimized.

2. The method of claim 1, wherein the object sensor detects the at least one static object in a plane.

3. The method of claim 2, wherein the at least one static object is an elongated object that appears basically punctiform in the detection plane.

4. The method of claim 3, wherein the alignment error of the object sensor comprises an azimuth angle error.

5. The method of claim 3, wherein the error parameter is calculated from the Helmert point error.

6. The method of claim 2, wherein the alignment error of the object sensor comprises an azimuth angle error.

7. The method of claim 2, wherein the error parameter is calculated from the Helmert point error.

8. The method of claim 1, wherein the alignment error of the object sensor comprises an azimuth angle error.

9. The method of claim 8, wherein the error parameter is iteratively minimized by changing the azimuth angle error.

10. The method of claim 9, wherein the error parameter is calculated from the Helmert point error.

11. The method of claim 8, wherein the error parameter is minimized by an optimization method.

12. The method of claim 8, wherein the error parameter is calculated from the Helmert point error.

13. The method of claim 1, wherein the error parameter is calculated from the Helmert point error.

14. The method of claim 1, wherein more than one static object is detected.

15. The method of claim 1, wherein the absolute positions of the object sensor are also detected.

16. The method of claim 1, wherein the positions of the static object are calculated from the positions of the object sensor by polar appending.

17. The method of claim 16, wherein an error-corrected position of the static object is calculated.

18. The method of claim 17, wherein an absolute position of the object sensor is determined from the error-corrected position of the static object and a known absolute position of the static object.

19. The method of claim 1, wherein the object sensor comprises at least one of a radar sensor, an ultrasonic sensor, a laser sensor, and an image sensor.

20. The method of claim 1, wherein the object sensor is installed in a vehicle.

* * * * *